US012605679B2

(12) United States Patent
Zhao et al.

(10) Patent No.: US 12,605,679 B2
(45) Date of Patent: Apr. 21, 2026

(54) POLYAMIDE COMPOSITE REVERSE OSMOSIS MEMBRANE AND PREPARATION METHOD THEREOF

(71) Applicant: HUNAN KEENSEN TECHNOLOGY CO., LTD., Changsha (CN)

(72) Inventors: Liang Zhao, Changsha (CN); Haohao Zeng, Changsha (CN); Jing Long, Changsha (CN); Xing Chen, Changsha (CN); Jiaojiao Tu, Changsha (CN); Zhaohua Ren, Changsha (CN); Yu Liu, Changsha (CN); Chudao Shi, Changsha (CN); Liang He, Changsha (CN)

(73) Assignee: HUNAN KEENSEN TECHNOLOGY CO., LTD., Changsha (CN)

( * ) Notice: Subject to any disclaimer, the term of this patent is extended or adjusted under 35 U.S.C. 154(b) by 358 days.

(21) Appl. No.: 18/039,279

(22) PCT Filed: Jul. 6, 2022

(86) PCT No.: PCT/CN2022/104039
§ 371 (c)(1),
(2) Date: May 29, 2023

(87) PCT Pub. No.: WO2023/280191
PCT Pub. Date: Jan. 12, 2023

(65) Prior Publication Data
US 2023/0415103 A1 Dec. 28, 2023

(30) Foreign Application Priority Data
Jul. 8, 2021 (CN) .......................... 202110771817.9

(51) Int. Cl.
| | |
|---|---|
| *B01D 69/12* | (2006.01) |
| *B01D 61/02* | (2006.01) |
| *B01D 67/00* | (2006.01) |
| *B01D 69/02* | (2006.01) |
| *B01D 71/56* | (2006.01) |
| *B01D 71/78* | (2006.01) |

(52) U.S. Cl.
CPC ....... *B01D 69/1251* (2022.08); *B01D 61/025* (2013.01); *B01D 67/0006* (2013.01); *B01D 67/00091* (2022.08); *B01D 67/00931* (2022.08); *B01D 69/02* (2013.01); *B01D 71/56* (2013.01); *B01D 71/78* (2013.01); *B01D 2323/38* (2013.01); *B01D 2325/30* (2013.01)

(58) Field of Classification Search
None
See application file for complete search history.

(56) References Cited

U.S. PATENT DOCUMENTS

2012/0241373 A1 9/2012 Na et al.

FOREIGN PATENT DOCUMENTS

| CN | 101530751 A | 9/2009 |
| CN | 104190272 A | 12/2014 |
| CN | 104324619 A | 2/2015 |
| CN | 109731486 A | 5/2019 |
| CN | 110975644 A | * 4/2020 ............. C02F 1/441 |
| CN | 113209843 A | 8/2021 |

OTHER PUBLICATIONS

Chen et al, Thermo-responsive Polypeptides from Pegylated Poly-L-glutamates, Biomacromolecules, 2011, 12, 2859-2863 (Year: 2011).*
International Search Report for PCT/CN2022/104039 mailed Sep. 28, 2022, ISA/CN.
He Chaoliang et al. "Synthesis and Characterization of a Temperature-Sensitive Poly(L-Glutamate)-G-Oligoethylene Glycol Graft Copolymer" 2011 National Polymer Academic Papers Conference Paper Abstracts, Sep. 28, 2011, p. 701.
Wu, Yan. "Preparation and Thermoresponsive Properties of Poly (L-glutamate) Bearing Oligo Ethylene Glycol Pendants" China Master's Theses Full-text Database, No. 04, Apr. 15, 2016, ISSN: 1674-0246, Chapter 2, section 2.1.

* cited by examiner

*Primary Examiner* — Krishnan S Menon
(74) *Attorney, Agent, or Firm* — You (Robert) Xu; Apex Attorneys at Law, LLP

(57) ABSTRACT

The present invention belongs to the technical field of membranes, and in particular relates to a polyamide composite reverse osmosis membrane and to a preparation method thereof. The polyamide composite reverse osmosis membrane provided by the present invention comprises: a nascent membrane and a temperature-responsive polypeptide grafted to a surface of the nascent membrane; the nascent membrane comprises a support layer and a polyamide separation layer joined to the support layer; the temperature-responsive polypeptide is a homopolymeric (L-glutamate) containing oligo(ethylene glycol). The polyamide composite reverse osmosis membrane provided in the present invention has excellent pollution resistance and oxidation resistance capabilities, has a low difficulty of cleaning, and has extremely broad market prospects.

10 Claims, No Drawings

POLYAMIDE COMPOSITE REVERSE OSMOSIS MEMBRANE AND PREPARATION METHOD THEREOF

CROSS REFERENCE TO RELATED APPLICATIONS

This application is the national phase of International Application No. PCT/CN2022/104039, titled "POLYAMIDE COMPOSITE REVERSE OSMOSIS MEMBRANE AND PREPARATION METHOD THEREOF", filed on Jul. 6, 2022, which claims the priority to Chinese Patent Application No. 202110771817.9, titled "POLYAMIDE COMPOSITE REVERSE OSMOSIS MEMBRANE AND PREPARATION METHOD THEREOF", filed on Jul. 8, 2021 with the China National Intellectual Property Administration, which are incorporated herein by reference in entirety.

FIELD

The present disclosure belongs to the technical field of membranes, and in particular relates to a polyamide composite reverse osmosis membrane and a production method thereof.

BACKGROUND

Reverse osmosis technology is an advanced and effectively energy-saving separation technology today. Its principle is to separate the solute in the solution from the solvent under a pressure higher than the osmotic pressure of the solution, by the selective interception effect of the semipermeable membrane that only allows water to pass through and does not allow other substances to pass through. Impurities such as dissolved salts, colloids, organic matter, bacteria, and microorganisms in water can be effectively removed by the separation characteristics of the reverse osmosis membrane, showing advantages of low energy consumption, no pollution, advanced technology, and easy operation and maintenance.

The core of reverse osmosis technology is reverse osmosis membrane. There are various reverse osmosis membranes, among which polyamide composite reverse osmosis membrane has been widely concerned and used due to its excellent physical and chemical stability, but it also has many shortcomings. Specifically, due to the inherent hydrophobicity of the polyamide composite reverse osmosis membrane, various pollutants in the feed water are easily adhered to the membrane surface during the application, resulting in reduction of membrane flux and increase of energy consumption. The membrane must be physically or chemically cleaned to remove the pollutant layer to a certain extent. However, the traditional cleaning method has high cost and poor effect, and even causes the decline or even failure of the separation performance of the membrane. Moreover, the active chlorine antibacterial agent added during the feed water pre-treatment process may also oxidize the polyamide layer, resulting in a significant decrease in the desalination rate of the membrane. Therefore, it is of great theoretical and practical significance to improve the pollution resistant ability of the reverse osmosis membrane, reduce the difficulty of cleaning and improve the oxidation resistant capability of the reverse osmosis membrane.

SUMMARY

In view of this, the object of the present invention is to provide a polyamide composite reverse osmosis membrane and a production method thereof. The reverse osmosis membrane provided by the present invention has excellent pollution resistance and oxidation resistance capabilities, and low difficulty of cleaning.

The present invention provides a polyamide composite reverse osmosis membrane, comprising a nascent membrane and a temperature-responsive polypeptide grafted onto the surface of the nascent membrane;

wherein, the nascent membrane comprises a support layer and a polyamide separation layer joined to the support layer;

the temperature-responsive polypeptide is a homopolymeric poly(L-glutamate) containing oligo(ethylene glycol).

Preferably, the homopolymeric poly(L-glutamate) containing oligo(ethylene glycol) has a polymerization degree of 30-100.

Preferably, the polyamide separation layer is formed by interfacial polymerization of the aqueous phase liquid and the oil phase liquid sequentially coated on the surface of the support layer;

wherein, the aqueous phase liquid comprises components of multifunctional amine, a surfactant, a polar solvent, a pH adjusting agent and water; and the oil phase liquid comprises components of multifunctional acyl halide and solvent oil.

Preferably, the multifunctional amine is selected from the group consisting of m-phenylenediamine, ethylenediamine, propanediamine, butanediamine, hexanediamine, N-(2-hydroxyethyl)ethylenediamine, 1,2-diaminocyclohexane, 1,3-diaminocyclohexane, 1,4-diaminocyclohexane, diethylenetriamine, m-phenylenediamine, p-phenylenediamine, o-phenylenediamine, 1,3,5-benzenetriamine, piperazine, 4-aminomethylpiperazine, and a mixture thereof.

Preferably, the multifunctional acyl halide is 1,3,5-benzenetricarbonyl trichloride.

The present invention provides a method for producing the polyamide composite reverse osmosis membrane described in the above technical solution, comprising the steps of:

immersing a nascent membrane in a grafting solution for grafting treatment to obtain a polyamide composite reverse osmosis membrane;

wherein the grafting solution comprises components of temperature-responsive polypeptide, an acid-binding agent and water.

Preferably, the acid-binding agent is selected from the group consisting of triethylamine, diisopropylethylamine, potassium carbonate, sodium hydroxide and a mixture thereof.

Preferably, the temperature-responsive polypeptide in the grafting solution has a content of 5-30 g/L; and the acid-binding agent in the grafting solution has a content of 0.05-5 wt %.

Preferably, the grafting treatment is carried out at 20-50° C. for 5-60 min.

Preferably, the nascent membrane is prepared by:

coating an aqueous phase liquid on the surface of a support layer, removing the excess aqueous phase liquid on the surface, and volatilizing water on the surface of the support layer; then coating an oil phase liquid on the surface of the support layer, and removing the excess oil phase liquid on the surface; finally, heating and drying the support layer coated with the aqueous phase liquid and the oil phase liquid; the aqueous phase liquid and the oil phase liquid undergoing interfacial polymerization on the support layer during the heating and drying process to form a poly-amide separation layer to obtain a nascent membrane; wherein the aqueous phase liquid comprises components of multifunctional amine, a surfactant, a pH adjusting agent, a polar solvent and water; and the oil phase liquid comprises components of multifunctional acyl halide and solvent oil.

Compared with the prior art, the present invention provides a polyamide composite reverse osmosis membrane and a production method thereof. The polyamide composite reverse osmosis membrane provided by the present invention comprises a nascent membrane and a temperature-responsive polypeptide grafted to a surface of the nascent membrane; the nascent membrane comprises a support layer and a polyamide separation layer joined to the support layer; the temperature-responsive polypeptide is a homopolymeric poly(L-glutamate) containing oligo(ethylene glycol). In the present invention, by grafting a temperature-responsive polypeptide to the surface of a polyamide reverse osmosis membrane, without affecting the flux and desalination rate of the reverse osmosis membrane, the reverse osmosis membrane has good pollution-resistance and oxidation-resistance properties. Moreover, by adjusting a cleaning temperature, adhered pollutants can be effectively washed away, resulting in an extremely high flux recovery rate after washing, thereby being able to greatly extend the service life of the reverse osmosis membrane. More specifically, in the present invention, the amino groups on the temperature-responsive polypeptide can react with the acyl chloride groups on the surface of the reverse osmosis membrane to graft the temperature-responsive polypeptide onto the surface of the polyamide reverse osmosis membrane. This process has simple operation and high grafting efficiency, and the temperature-responsive polypeptide and the polyamide reverse osmosis membrane are linked by chemical bonds, which are not easy to break. When the temperature is low, the polypeptide chain on the surface of the polyamide reverse osmosis membrane is in a stretched state, showing strong hydrophilicity, which can reduce adherence of hydrophobic pollutants to the surface of the membrane, thereby enhancing the pollution resistance ability of the reverse osmosis membrane; when the temperature is high, the polypeptide chain on the surface of the polyamide reverse osmosis membrane changes from a stretched state to a curled state, causing the pollutant layer adhered on the surface of the membrane to rupture, which is thus easily to be washed away. The polyamide reverse osmosis membrane is usually used at a temperature lower than 30° C., enabling the membrane to have good pollution resistance ability under normal operating conditions. When the surface of the membrane needs to be cleaned, only increasing the temperature of the feed water is needed to achieve a good cleaning effect. Moreover, the fatty acid amide bond in the polypeptide can be used as a sacrificial layer, which preferentially reacts with the active chlorine in the water body, protecting the inner polyamide layer from oxidation, thereby improving the oxidation resistance ability of the polyamide reverse osmosis membrane. The polyamide composite reverse osmosis membrane provided by the present invention has excellent pollution resistance and oxidation resistance capabilities, has a low difficulty of cleaning, and has extremely broad market prospects.

DETAILED DESCRIPTION

The following clearly and completely describes the technical solutions in the embodiments of the present invention.

Apparently, the described examples are only some of the embodiments of the present invention, but not all of them. Based on the examples of the present invention, all other examples obtained by those of ordinary skill in the art without making creative efforts belong to the protection scope of the present invention.

The present invention provides a polyamide composite reverse osmosis membrane, comprising a nascent membrane and a temperature-responsive polypeptide grafted onto the surface of the nascent membrane; wherein, the nascent membrane comprises a support layer and a polyamide separation layer joined to the support layer; the temperature-responsive polypeptide is a homopolymeric poly(L-glutamate) containing oligo(ethylene glycol).

In the polyamide composite reverse osmosis membrane provided by the present invention, the support layer is preferably a polysulfone support layer; the support layer has a thickness of preferably 20-50 μm, specifically 20 μm, 25 μm, 30 μm, 35 μm, 40 μm, 45 μm or 50 μm, most preferably 40 μm; the support layer has a molecular weight cut-off of preferably 20000-30000 Da; and the support layer has a porosity rate of preferably 5-7%.

In the polyamide composite reverse osmosis membrane provided by the present invention, the polyamide separation layer is preferably formed by interfacial polymerization of the aqueous phase liquid and the oil phase liquid sequentially coated on the surface of the support layer, wherein the aqueous phase liquid comprises components of multifunctional amine, a surfactant, a polar solvent, a pH adjusting agent and water; and the oil phase liquid comprises components of multifunctional acyl halide and solvent oil.

In the polyamide composite reverse osmosis membrane provided by the present invention, the multifunctional amine in the aqueous phase liquid is preferably selected from the group consisting of m-phenylenediamine, ethylenediamine, propanediamine, butanediamine, hexanediamine, N-(2-hydroxyethyl)ethylenediamine, 1,2-diaminocyclohexane, 1,3-diaminocyclohexane, 1,4-diaminocyclohexane, diethylenetriamine, m-phenylenediamine, p-phenylenediamine, o-phenylenediamine, 1,3,5-benzenetriamine, piperazine, 4-aminomethylpiperazine, and a mixture thereof, more preferably m-phenylenediamine; and the multifunctional amine in the aqueous phase liquid has a mass concentration of preferably 0.5-5 wt %, specifically 0.5 wt %, 1 wt %, 1.5 wt %, 2 wt %, 2.5 wt %, 3 wt %, 3.5 wt %, 4 wt %, 4.5 wt % or 5 wt %, most preferably 3 wt %.

In the polyamide composite reverse osmosis membrane provided by the present invention, the surfactant in the aqueous phase liquid is preferably selected from the group consisting of sodium dodecylbenzenesulfonate, sodium lauryl sulfate, and a mixture thereof, more preferably sodium dodecylbenzenesulfonate; and the surfactant in the aqueous phase liquid has a mass concentration of preferably 0.1-2 wt %, specifically 0.1 wt %, 0.2 wt %, 0.3 wt %, 0.4 wt %, 0.5 wt %, 0.7 wt %, 1 wt %, 1.2 wt %, 1.5 wt % or 2 wt %, most preferably 0.3 wt %.

In the polyamide composite reverse osmosis membrane provided by the present invention, the polar solvent in the aqueous phase liquid is preferably selected from the group consisting of dimethyl sulfoxide, N-methylpyrrolidone and a mixture thereof, more preferably N-methylpyrrolidone; and the polar solvent in the aqueous phase liquid has a mass concentration of preferably 1-10 wt %, specifically 1 wt %, 1.2 wt %, 1.5 wt %, 1.7 wt %, 2 wt %, 2.3 wt %, 2.5 wt %, 2.7 wt %, 3 wt %, 4 wt %, 5 wt %, 6 wt %, 7 wt %, 8 wt %, 9 wt % or 10 wt %, most preferably 2 wt %.

In the polyamide composite reverse osmosis membrane provided by the present invention, the pH adjusting agent in the aqueous phase liquid is preferably an alkali metal hydroxide, more preferably sodium hydroxide; and the pH adjusting agent is used to adjust the pH of the aqueous phase liquid to preferably 7-9, more preferably 8.5-9.

In the polyamide composite reverse osmosis membrane provided by the present invention, the multifunctional acyl halide in the oil phase liquid is preferably 1,3,5-benzenetricarbonyl trichloride; and the multifunctional acyl halide in the oil phase liquid has a mass concentration of preferably 0.05-0.5 wt %, specifically 0.05 wt %, 0.1 wt %, 0.15 wt %, 0.2 wt %, 0.25 wt %, 0.3 wt %, 0.35 wt %, 0.4 wt %, 0.45 wt % or 0.5 wt %, most preferably 0.3 wt %.

In the polyamide composite reverse osmosis membrane provided by the present invention, the solvent oil in the oil phase liquid is preferably selected from the group consisting of an aliphatic hydrocarbon containing 4 to 12 carbon atoms, a cycloaliphatic hydrocarbon containing 4 to 12 carbon atoms, an aromatic hydrocarbon containing 4 to 12 carbon atoms and a mixture thereof, more preferably the solvent oil with a trade mark of Isopar G.

In the polyamide composite reverse osmosis membrane provided by the present invention, the homopolymeric poly (L-glutamate) containing oligo(ethylene glycol) is abbreviated as PPLGm-g-OEG$_2$ (m represents the degree of polymerization); and the homopolymeric poly(L-glutamate) containing oligo(ethylene glycol) has a polymerization degree of preferably 30-100, specifically 30, 35, 40, 45, 50, 55, 60, 65, 70, 75, 80, 85, 90, 95 or 100.

The present invention also provides a method for producing the polyamide composite reverse osmosis membrane described in the above technical solution, comprising the steps of:

immersing a nascent membrane in a grafting solution for grafting treatment to obtain a polyamide composite reverse osmosis membrane.

In the method provided by the present invention, the nascent membrane comprises a support layer and a polyamide separation layer joined to the support layer, and is prepared by:

coating an aqueous phase liquid on the surface of a support layer, removing the excess aqueous phase liquid on the surface, and volatilizing water on the surface of the support layer; then coating an oil phase liquid on the surface of the support layer, and removing the excess oil phase liquid on the surface; finally, heating and drying the support layer coated with the aqueous phase liquid and the oil phase liquid; the aqueous phase liquid and the oil phase liquid undergoing interfacial polymerization on the support layer during the heating and drying process to form a polyamide separation layer to obtain a nascent membrane.

In the above preparation of the nascent membrane provided by the present invention, the material selection of the support layer, the composition of the aqueous phase liquid and the oil phase liquid have been introduced above, and will not be repeated here. The aqueous phase liquid is coated in a manner of preferably dip-coating, at a temperature of preferably 15-35° C., more preferably 25° C. (room temperature), for preferably 5-20 s, more preferably 10 s. The excess aqueous phase liquid is removed preferably by rolling a stainless steel roller. The water on the surface of the support layer is volatized preferably in a closed space with a heating and ventilation system, where the closed space is preferably controlled at an internal temperature of 20-30° C., and a relative humidity of 40-80%, and the support layer is kept in the closed space for preferably 20-60 s, more preferably 40 s. The oil phase liquid is coated in a manner of preferably dip-coating, at a temperature of preferably 40-60° C., more preferably 50° C., for preferably 30-60 s, more preferably 45 s. The heating and drying is carried out at preferably 60-80° C.

In the method provided by the present invention, the grafting solution comprises components of temperature-responsive polypeptide, an acid-binding agent and water. Among them, the specific selection of the temperature-responsive polypeptide has been introduced above, and will not be repeated here. The temperature-responsive polypeptide in the grafting solution has a content of preferably 5-30 g/L, specifically 5 g/L L, 7 g/L, 10 g/L, 12 g/L, 15 g/L, 17 g/L, 20 g/L, 23 g/L, 25 g/L, 27 g/L or 30 g/L. The acid-binding agent is preferably selected from the group consisting of triethylamine, diisopropylethylamine, potassium carbonate, sodium hydroxide and a mixture thereof, more preferably potassium carbonate or diisopropylethylamine.

The acid-binding agent in the grafting solution has a content of preferably 0.05-5 wt %, specifically 0.05 wt %, 0.1 wt %, 0.15 wt %, 0.2 wt %, 0.3 wt %, 0.5 wt %, 1 wt %, 1.5 wt %, 2 wt %, 2.5 wt %, 3 wt % %, 4 wt % or 5 wt %, most preferably 0.1 wt % or 2 wt %.

In the method provided by the present invention, the grafting treatment is carried out at preferably 20-50° C., specifically 20° C., 25° C., 30° C., 35° C., 40° C., 45° C. or 50° C., for preferably 5-60 min, specifically 5 min, 10 min, 15 min, 20 min, 25 min, 30 min, 35 min, 40 min, 45 min, 50 min, 55 min or 60 min. After the grafting treatment is completed, the membrane material is rinsed with deionized water and dried to obtain the polyamide composite reverse osmosis membrane provided by the present invention.

In the technical solution of the present invention, by grafting a temperature-responsive polypeptide to the surface of a polyamide reverse osmosis membrane, without affecting the flux and desalination rate of the reverse osmosis membrane, the reverse osmosis membrane has good pollution-resistance and oxidation-resistance properties. Moreover, by adjusting a cleaning temperature, adhered pollutants can be washed away effectively, resulting in an extremely high flux recovery rate after washing, thereby being able to greatly extend the service life of the reverse osmosis membrane. More specifically, in the present invention, the amino groups on the temperature-responsive polypeptide can react with the acyl chloride groups on the surface of the reverse osmosis membrane to graft the temperature-responsive polypeptide onto the surface of the polyamide reverse osmosis membrane. This process has simple operation and high grafting efficiency, and the temperature-responsive polypeptide and the polyamide reverse osmosis membrane are linked by chemical bonds, which are not easy to break. When the temperature is low, the polypeptide chain on the surface of the polyamide reverse osmosis membrane is in a stretched state, showing strong hydrophilicity, which can reduce adherence of hydrophobic pollutants to the surface of the membrane, thereby enhancing the pollution resistance ability of the reverse osmosis membrane; when the temperature is high, the polypeptide chain on the surface of the polyamide reverse osmosis membrane changes from a stretched state to a curled state, causing the pollutant layer adhered on the surface of the membrane to rupture, which is thus easily to be washed away. The polyamide reverse osmosis membrane is usually used at a temperature lower than 30° C., enabling the membrane to have good pollution resistance ability under normal operating conditions. When the surface of the membrane needs to be cleaned, only increasing the temperature of the feed water is needed to achieve a good cleaning effect. Moreover, the fatty acid amide bond in the polypeptide can be used as a sacrificial layer, which preferentially reacts with the active chlorine in the water body, protecting the inner polyamide layer from oxidation, thereby improving the oxidation resistance ability of the polyamide reverse osmosis membrane. The polyamide composite reverse osmosis membrane provided by the present invention has excellent pollution resistance and oxidation resistance capabilities, has a low difficulty of cleaning, and has extremely broad market prospects.

For more clarity, the following examples and comparative examples are described in detail.

Example 1

A pollution-resistant, easy-to-clean and oxidation-resistant polyamide composite reverse osmosis membrane was produced by a method as follows:

1) Preparation of aqueous phase liquid: 30 g of m-phenylenediamine, 3 g of sodium dodecylbenzenesulfonate, and 20 g of N-methylpyrrolidone were dissolved in 947 g of water, and the solution was adjusted to pH 8.5-9 with sodium hydroxide, and stirred evenly to obtain an aqueous phase liquid.

2) Preparation of oil phase liquid: 3 g of 1,3,5-benzenetricarbonyl trichloride was dissolved in 997 g of Isopar G (isoparaffin solvent, ExxonMobil), and the mixture was stirred evenly to obtain an oil phase liquid.

3) Preparation of grafting solution: $PPLG_{80}$-g-$OEG_2$ (polymerization degree: 80) and potassium carbonate were added to deionized water according to a concentration of $PPLG_{80}$-g-$OEG_2$ of 10 g/L and a concentration of potassium carbonate of 2 wt %, and fully dissolved to obtain a grafting solution.

4) Preparation of composite reverse osmosis membrane: The aqueous phase liquid was dip-coated on a polysulfone support layer (with a thickness of 40 μm, a molecular weight cut-off of 20000-30000 Da, and a porosity rate of 5-7%) at room temperature for 10 s. Then the excess aqueous phase liquid on the surface was removed by a stainless steel roller. The polysulfone bottom membrane coated with the aqueous phase liquid was passed through a closed space with a heating and ventilation system, which was controlled at an internal temperature of 20-30° C. and a relative humidity of 40-80%, and the polysulfone bottom membrane was kept in the device for 40 s to further volatilize the water on the membrane surface. Subsequently, the oil phase liquid was dip-coated on the membrane surface at 50° C. for 45 s. Then the excess oil phase liquid on the surface was drained off, and the resulting material was dried in an oven at 60-80° C. to form an ultra-thin polyamide separation layer, i.e., to obtain a nascent polyamide reverse osmosis membrane. Finally, the nascent polyamide reverse osmosis membrane was immersed in the grafting solution at 25° C. for 60 min, rinsed with deionized water and then dried to obtain a polyamide composite reverse osmosis membrane that is pollution-resistant, easy-to-clean and oxidation-resistant.

5) Evaluation of pollution-resistant performance and cleaning difficulty: 2000 ppm sodium chloride aqueous solution was filtered at 1.55 MPa, 25° C. and a flow rate on membrane surface of 1.1 L/min for 30 min, and a test was conducted to obtain the initial flux of the membrane material. The aqueous solution to be tested was replaced with 1000 ppm bovine serum albumin solution and lysozyme solution under the same operating conditions. The bovine serum albumin solution was first filtered for 150 min, and then the lysozyme solution was filtered for 90 min. After a total of 240 min, a test was conducted to obtain the flux after the membrane material was polluted. The test solution was then replaced with deionized water, which was filtered for cleaning at 1.55 MPa, 50° C. and a flow rate on membrane surface of 1 L/min for 20 min. Finally 2000 ppm sodium chloride aqueous solution was filtered at 1.55 MPa, 25° C. and a flow rate on membrane surface of 1 L/min for 30 min, and a test was conducted to obtain the flux after the membrane material was cleaned. The test results are shown in Table 1.

6) Evaluation of oxidation-resistant ability: First, the membrane material was subjected to static accelerated oxidation by contacting the membrane material with 500 ppm sodium hypochlorite aqueous solution with a pH of 4.0 at 25° C. for 6 h. Then the membrane material was rinsed with pure water and soaked in pure water for 48 h. 2000 ppm sodium chloride aqueous solution was filtered at 1.55 MPa, 25° C. and a flow rate on membrane surface of 1.1 L/min for 30 min, and a test was conducted to obtain the water flux and desalination rate of the membrane material. The measured oxidation-resistant performance data are shown in Table 2.

Example 2

A pollution-resistant, easy-to-clean and oxidation-resistant polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: $PPLG_{80}$-g-$OEG_2$ (polymerization degree: 80) and potassium carbonate were added to deionized water according to a concentration of $PPLG_{80}$-g-$OEG_2$ of 20 g/L and a concentration of potassium carbonate of 2 wt %, and fully dissolved to obtain a grafting solution.

4) Preparation of composite reverse osmosis membrane: The process was the same as in Example 1 except that the grafting solution prepared in step 3) of this example was used.

5) Evaluation of pollution-resistant performance and cleaning difficulty: The process was the same as in Example 1.

6) Evaluation of oxidation-resistant ability: The process was the same as in Example 1.

Example 3

A pollution-resistant, easy-to-clean and oxidation-resistant polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: $PPLG_{80}$-g-$OEG_2$ (polymerization degree: 80) and potassium carbonate were added to deionized water according to a concentration of $PPLG_{80}$-g-$OEG_2$ of 30 g/L and a concentration of potassium carbonate of 2 wt %, and fully dissolved to obtain a grafting solution.

4) Preparation of composite reverse osmosis membrane: The process was the same as in Example 1 except that the grafting solution prepared in step 3) of this example was used.

5) Evaluation of pollution-resistant performance and cleaning difficulty: The process was the same as in Example 1.

6) Evaluation of oxidation-resistant ability: The process was the same as in Example 1.

Example 4

A pollution-resistant, easy-to-clean and oxidation-resistant polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: $PPLG_{30}$-g-$OEG_2$ (polymerization degree: 30) and diisopropylethylamine were added to deionized water according to a concentration of $PPLG_{30}$-g-$OEG_2$ of 20 g/L and a concentration of diisopropylethylamine of 0.1 wt %, and fully dissolved to obtain a grafting solution.

4) Preparation of composite reverse osmosis membrane: The process was the same as in Example 1 except that the grafting solution prepared in step 3) of this example was used.

5) Evaluation of pollution-resistant performance and cleaning difficulty: The process was the same as in Example 1.

6) Evaluation of oxidation-resistant ability: The process was the same as in Example 1.

Example 5

A pollution-resistant, easy-to-clean and oxidation-resistant polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: $PPLG_{50}$-g-$OEG_2$ (polymerization degree: 50) and potassium carbonate were added to deionized water according to a concentration of $PPLG_{50}$-g-$OEG_2$ of 20 g/L and a concentration of potassium carbonate of 2 wt %, and fully dissolved to obtain a grafting solution.

4) Preparation of composite reverse osmosis membrane: The process was the same as in Example 1 except that the grafting solution prepared in step 3) of this example was used.

5) Evaluation of pollution-resistant performance and cleaning difficulty: The process was the same as in Example 1.

6) Evaluation of oxidation-resistant ability: The process was the same as in Example 1.

Comparative Example 1

A polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of composite reverse osmosis membrane: The process was the same as in Example 1 except that no grafting treatment was performed after obtaining the nascent polyamide reverse osmosis membrane.

4) Evaluation of pollution-resistant performance and cleaning difficulty: 2000 ppm sodium chloride aqueous solution was filtered at 1.55 MPa, 25° C. and a flow rate on membrane surface of 1.1 L/min for 30 min, and a test was conducted to obtain the initial flux of the membrane material. The aqueous solution to be tested was replaced with 1000 ppm bovine serum albumin solution and lysozyme solution under the same operating conditions. The bovine serum albumin solution was first filtered for 150 min, and then the lysozyme solution was filtered for 90 min. After a total of 240 min, a test was conducted to obtain the flux after the membrane material was polluted. The solution to be tested was then replaced with deionized water, which was filtered for cleaning at 1.55 MPa, 40° C. and a flow rate on membrane surface of 1 L/min for 20 min. Finally 2000 ppm sodium chloride aqueous solution was filtered at 1.55 MPa, 25° C. and a flow rate on membrane surface of 1 L/min for 30 min, and a test was conducted to obtain the flux after the membrane material was cleaned. The test results are shown in Table 1.

5) Evaluation of oxidation-resistant ability: First, the membrane material was subjected to static accelerated oxidation by contacting the membrane material with 500 ppm sodium hypochlorite aqueous solution with a pH of 4.0 at 25° C. for 6 h. Then the membrane material was rinsed with pure water and soaked in pure water for 48 h. 2000 ppm sodium chloride aqueous solution was filtered at 1.55 MPa, 25° C. and a flow rate on membrane surface of 1.1 L/min for 30 min, and a test was conducted to obtain the water flux and desalination rate of the membrane material. The measured oxidation-resistant performance data are shown in Table 2.

Comparative Example 2

A polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: Polyglutamic acid (polymerization degree: 80) and potassium carbonate were added to deionized water according to a concentration of polyglutamic acid of 30 g/L and a concentration of potassium carbonate of 2 wt %, and fully dissolved to obtain a grafting solution.

4) Preparation of composite reverse osmosis membrane: The process was the same as in Example 1 except that the grafting solution prepared in step 3) of this comparative example was used.

5) Evaluation of pollution-resistant performance and cleaning difficulty: 2000 ppm sodium chloride aqueous solution was filtered at 1.55 MPa, 25° C. and a flow rate on membrane surface of 1.1 L/min for 30 min, and a test was conducted to obtain the initial flux of the membrane material. The aqueous solution to be tested was replaced with 1000 ppm bovine serum albumin solution and lysozyme solution under the same operating conditions. The bovine serum albumin solution was first filtered for 150 min, and then the lysozyme solution was filtered for 90 min. After a total of 240 min, a test was conducted to obtain the flux after the membrane material was polluted. The solution to be tested was then replaced with deionized water, which was filtered for cleaning at 1.55 MPa, 50° C. and a flow rate on membrane surface of 1 L/min for 20 min. Finally 2000 ppm sodium chloride aqueous solution was filtered at 1.55 MPa, 25° C. and a flow rate on membrane surface of 1 L/min for 30 min, and a test was conducted to obtain the flux after the membrane material was cleaned. The test results are shown in Table 1.

6) Evaluation of oxidation-resistant ability: First, the membrane material was subjected to static accelerated oxidation by contacting the membrane material with 500 ppm sodium hypochlorite aqueous solution with a pH of 4.0 at 25° C. for 6 h. Then the membrane material was rinsed with pure water and soaked in pure water for 48 h. 2000 ppm sodium chloride aqueous solution was filtered at 1.55 MPa, 25° C. and a flow rate on membrane surface of 1.1 L/min for 30 min, and a test was conducted to obtain the water flux and desalination rate of the membrane material. The measured oxidation-resistant performance data are shown in Table 2.

Comparative Example 3

A polyamide composite reverse osmosis membrane was produced by a method as follows:

1) Preparation of aqueous phase liquid: The process was the same as in Example 1.

2) Preparation of oil phase liquid: The process was the same as in Example 1.

3) Preparation of grafting solution: Grafting solution A: Diethylenetriamine was added into deionized water at 10 g/L, and fully dissolved to obtain a grafting solution A. Grafting solution B: Maleic anhydride was added into deionized water at 10 g/L, and fully dissolved to obtain a grafting solution B.

4) Preparation of composite reverse osmosis membrane: The process was the same as in Example 1 except that after obtaining the nascent polyamide reverse osmosis membrane, the nascent polyamide reverse osmosis membrane was first immersed in the grafting solution A at 25° C. for 6 h, rinsed with ethanol and then deionized water, dried, and then immersed in the post-grafting treatment solution B at room temperature (25° C.) for 10 h of reaction, and the resulting material was dried to obtain a polyamide composite reverse osmosis membrane.

5) Evaluation of pollution-resistant performance and cleaning difficulty: 2000 ppm sodium chloride aqueous solution was filtered at 1.55 MPa, 25° C. and a flow rate on membrane surface of 1.1 L/min for 30 min, and a test was conducted to obtain the initial flux of the membrane material. The aqueous solution to be tested was replaced with 1000 ppm bovine serum albumin solution and lysozyme solution under the same operating conditions. The bovine serum albumin solution was first filtered for 150 min, and then the lysozyme solution was filtered for 90 min. After a total of 240 min, a test was conducted to obtain the flux after the membrane material was polluted. The solution to be tested was then replaced with deionized water, which was filtered at 0.5 MPa, 25° C. and a flow rate on membrane surface of 3 L/min for 30 min to wash away the protein adhering to the membrane surface, and then filtered for cleaning at pH=3, 1.55 MPa, 25° C. and a flow rate on membrane surface of 1 L/min for 10 min. Finally 2000 ppm sodium chloride aqueous solution was filtered at 1.55 MPa, 25° C. and a flow rate on membrane surface of 1 L/min for 30 min, and a test was conducted to obtain the flux after the membrane material was cleaned. The test results are shown in Table 1.

6) Evaluation of oxidation-resistant ability: First, the membrane material was subjected to static accelerated oxidation by contacting the membrane material with 500 ppm sodium hypochlorite aqueous solution with a pH of 4.0 at 25° C. for 6 h. Then the membrane material was rinsed with pure water and soaked in pure water for 48 h. 2000 ppm sodium chloride aqueous solution was filtered at 1.55 MPa, 25° C. and a flow rate on membrane surface of 1.1 L/min for 30 min, and a test was conducted to obtain the water flux and desalination rate of the membrane material. The measured oxidation-resistant performance data are shown in Table 2.

TABLE 1

Anti-pollution performance and flux recovery data after cleaning of polyamide composite reverse osmosis membrane

| | Comparative example 1 | Comparative example 2 | Comparative example 3 | Example 1 | Example 2 | Example 3 | Example 4 | Example 5 |
|---|---|---|---|---|---|---|---|---|
| Initial flux/ GFD | 37.1 | 42.2 | 40.2 | 39.4 | 41.5 | 41.7 | 43.6 | 42.1 |
| Flux after pollution/ GFD | 12.2 | 17.9 | 16.8 | 16.0 | 17.8 | 18.1 | 19.7 | 18.4 |
| Flux after cleaning/ GFD | 26.7 | 34.6 | 37.5 | 36.3 | 38.8 | 39.1 | 39.4 | 38.3 |
| Decline rate of flux after pollution/% | 67.1 | 57.5 | 58.2 | 59.4 | 57.2 | 56.7 | 54.2 | 56.2 |
| Recovery rate of flux after cleaning/% | 72.1 | 81.9 | 93.4 | 92.2 | 93.6 | 93.7 | 90.5 | 91.0 |

Decline rate of flux after pollution = (1 − Flux after pollution/Initial flux)*100%;

Recovery rate of flux after cleaning = (Flux after cleaning/Initial flux)*100%.

TABLE 2

| | Comparative example 1 | Comparative example 2 | Comparative example 3 | Example 1 | Example 2 | Example 3 | Example 4 | Example 5 |
|---|---|---|---|---|---|---|---|---|
| Anti-oxidation performance data of polyamide composite reverse osmosis membrane | | | | | | | | |
| Initial flux/ GFD | 37.1 | 42.2 | 40.2 | 39.4 | 41.5 | 41.7 | 43.6 | 42.1 |
| Initial desalination rate/% | 99.13 | 98.77 | 99.00 | 99.06 | 98.94 | 98.83 | 98.65 | 98.81 |
| Flux after oxidation/ GFD | 16.6 | 19.2 | 18.4 | 18.5 | 19.8 | 20.1 | 19.9 | 19.7 |
| Desalination rate after oxidation/% | 93.74 | 98.02 | 94.94 | 98.21 | 98.38 | 98.31 | 97.96 | 98.20 |
| Decline rate of flux/% | 55.17 | 54.58 | 54.20 | 53.15 | 52.22 | 51.89 | 54.36 | 53.27 |
| Decline rate of desalination rate/% | 5.44 | 0.75 | 4.06 | 0.86 | 0.57 | 0.53 | 0.69 | 0.62 |

From the results of Table 1, it can be seen that the decline rates of flux after pollution of Examples 1-5 were far lower than that of Comparative Example 1, and the recovery rates of flux after cleaning were far greater than those of Comparative Example 1 and Comparative Example 2. From the results of Table 2, it can be seen that decline rates of desalination rate after oxidation of Examples 1-5 were much lower than those of Comparative Examples 1 and 3. It can be seen that Examples 1-5 have both good pollution resistance and oxidation resistance capabilities and are easy to be cleaned after pollution.

The descriptions of the above examples are only used to help understand the method and core idea of the present invention. It should be noted that those of ordinary skill in the art can make several improvements and modifications to the present invention without departing from the principles of the present invention, and these improvements and modifications also fall within the protection scope of the claims of the present invention. The above description of the disclosed examples enables those skilled in the art to realize or use the present invention, and various modifications to these examples are apparent to those skilled in the art. The general principles defined herein may be implemented in other embodiments without departing from the spirit or scope of the present invention. Accordingly, the present invention will not be limited to the examples shown herein, but is to be accorded the widest scope consistent with the principles and novel features disclosed herein.

The invention claimed is:

1. A polyamide composite reverse osmosis membrane, comprising a nascent membrane and a temperature-responsive polypeptide grafted onto a surface of the nascent membrane;
   wherein the nascent membrane comprises a support layer and a polyamide separation layer joined to the support layer;
   the temperature-responsive polypeptide is a homopolymeric poly(L-glutamate) containing oligo(ethylene glycol).

2. The polyamide composite reverse osmosis membrane according to claim 1, wherein the homopolymeric poly(L-glutamate) containing oligo(ethylene glycol) has a polymerization degree of 30-100.

3. The polyamide composite reverse osmosis membrane according to claim 1, wherein the polyamide separation layer is formed by interfacial polymerization of an aqueous phase liquid and an oil phase liquid sequentially coated on a surface of the support layer;
   wherein the aqueous phase liquid comprises a multifunctional amine, a surfactant, a polar solvent, a pH adjusting agent and water; and the oil phase liquid comprises a multifunctional acyl halide and solvent oil.

4. The polyamide composite reverse osmosis membrane according to claim 3, wherein the multifunctional amine is selected from the group consisting of m-phenylenediamine, ethylenediamine, propanediamine, butanediamine, hexanediamine, N-(2-hydroxyethyl)ethylenediamine, 1,2-diaminocyclohexane, 1,3-diaminocyclohexane, 1,4-diaminocyclohexane, diethylenetriamine, m-phenylenediamine, p-phenylenediamine, o-phenylenediamine, 1,3,5-benzenetriamine, piperazine, 4-aminomethylpiperazine, and a mixture thereof.

5. The polyamide composite reverse osmosis membrane according to claim 3, wherein the multifunctional acyl halide is 1,3,5-benzenetricarbonyl trichloride.

6. A method for producing the polyamide composite reverse osmosis membrane according to claim 1, comprising the steps of:
   immersing a nascent membrane in a grafting solution for grafting treatment to obtain a polyamide composite reverse osmosis membrane;
   wherein the grafting solution comprises components of temperature-responsive polypeptide, an acid-binding agent and water.

7. The method according to claim 6, wherein the acid-binding agent is selected from the group consisting of triethylamine, diisopropylethylamine, potassium carbonate, sodium hydroxide and a mixture thereof.

8. The method according to claim 6, wherein the temperature-responsive polypeptide in the grafting solution has a content of 5-30 g/L; and the acid-binding agent in the grafting solution has a content of 0.05-5 wt %.

9. The method according to claim 6, wherein the grafting treatment is carried out at 20-50° C. for 5-60 min.

10. The method according to claim 6, wherein the nascent membrane is prepared by:
   coating an aqueous phase liquid on the surface of a support layer, removing the excess aqueous phase liquid on the surface, and volatilizing water on the surface of the support layer; then coating an oil phase liquid on the surface of the support layer, and removing the excess oil phase liquid on the surface; finally, heating and drying the support layer coated with the aqueous phase liquid and the oil phase liquid; the aqueous phase liquid and the oil phase liquid undergoing interfacial polymerization on the support layer during the heating and drying process to form a polyamide separation layer to obtain a nascent membrane; wherein the aqueous phase liquid comprises components of multifunctional amine, a surfactant, a pH adjusting agent, a polar solvent and water; and the oil phase liquid comprises components of multifunctional acyl halide and solvent oil.

* * * * *